United States Patent [19]

Mallik

[11] Patent Number: 5,411,296
[45] Date of Patent: May 2, 1995

[54] NON-CONTINUOUS HOLOGRAMS, METHODS OF MAKING THEM AND ARTICLES INCORPORATING THEM

[75] Inventor: Donald W. Mallik, North Tarrytown, N.Y.

[73] Assignee: American Banknote Holographics, Inc., Elmsford, N.Y.

[21] Appl. No.: 939,474

[22] Filed: Sep. 2, 1992

Related U.S. Application Data

[63] Continuation of Ser. No. 291,247, Dec. 23, 1988, Pat. No. 5,145,212, which is a continuation-in-part of Ser. No. 160,641, Feb. 26, 1988, abandoned, which is a continuation-in-part of Ser. No. 156,305, Feb. 12, 1988, abandoned.

[51] Int. Cl.$^6$ .................. B42D 15/00; G03H 1/02
[52] U.S. Cl. .................. 283/86; 283/72; 283/91; 283/94; 283/904; 359/2
[58] Field of Search .................. 283/117, 904, 85, 86, 283/72, 91, 94; 359/2

[56] References Cited

U.S. PATENT DOCUMENTS

| | | |
|---|---|---|
| 1,285,753 | 11/1918 | Lowenstein . |
| 3,282,720 | 11/1966 | Oleksiw . |
| 3,506,327 | 4/1970 | Leith et al. . |
| 3,698,795 | 10/1972 | Flint . |
| 3,881,800 | 5/1975 | Friesem . |
| 4,014,602 | 3/1977 | Ruell . |
| 4,034,211 | 7/1977 | Horst et al. . |
| 4,119,361 | 10/1978 | Greenaway . |
| 4,129,382 | 8/1979 | Greenaway . |
| 4,168,088 | 9/1979 | Somlyody . |
| 4,304,809 | 12/1981 | Moraw et al. . |
| 4,341,404 | 7/1982 | Mowry, Jr. et al. . |
| 4,400,057 | 8/1983 | Moraw et al. . |
| 4,417,784 | 11/1983 | Knop et al. . |
| 4,421,380 | 12/1983 | McGrew . |
| 4,439,994 | 8/1984 | Beckett . |
| 4,484,797 | 11/1984 | Knop et al. . |
| 4,522,614 | 11/1985 | Beckett . |
| 4,576,439 | 3/1986 | Gale et al. . |
| 4,589,686 | 5/1986 | McGrew . |
| 4,591,707 | 5/1986 | Stenzel et al. . |
| 4,662,653 | 5/1987 | Greenaway . |
| 4,673,609 | 6/1987 | Hill . |
| 4,677,285 | 6/1987 | Taniguchi . |
| 4,685,138 | 8/1987 | Antes et al. . |
| 4,717,221 | 1/1988 | McGrew .................. 350/3.7 |
| 4,728,377 | 3/1988 | Gallagher . |
| 4,765,656 | 8/1988 | Becker et al. . |
| 4,856,857 | 8/1989 | Takeuchi et al. . |
| 4,913,858 | 4/1990 | Miekka et al. . |

FOREIGN PATENT DOCUMENTS

| | | |
|---|---|---|
| 75674A2 | 4/1983 | European Pat. Off. . |
| 253089A1 | 1/1988 | European Pat. Off. . |
| 2027441A | 2/1980 | United Kingdom . |
| 2136352 | 9/1984 | United Kingdom . |

*Primary Examiner*—Paul A. Bell
*Attorney, Agent, or Firm*—Majestic, Parsons, Siebert & Hsue

[57] ABSTRACT

Non-continuous reflective holograms or diffraction gratings are provided in various forms for authenticating documents and things, and for decorative and product packaging applications. In one specific authentication application, such a hologram or diffraction grating is firmly attached to a surface that contains visual information desired to be protected from alteration. Examples of such information include written personal data and photograph on a passport, driver's license, identity card and the like. The reflective discontinuous hologram is formed in a pattern that both permits viewing the protected information through it and the viewing of an authenticating image or other light pattern reconstructed from it in reflection. In another specific authentication application, a non-transparent structure of two side-by-side non-continuous holograms or diffraction patterns, each reconstructing a separate image or other light pattern, increases the difficulty of counterfeiting the structure.

12 Claims, 5 Drawing Sheets

NON-CONTINUOUS HOLOGRAMS, METHODS OF MAKING THEM AND ARTICLES INCORPORATING THEM

CROSS-REFERENCE TO RELATED APPLICATIONS

This is a continuation of application Ser. No. 07/291,247, filed Dec. 23, 1988, now U.S. Pat. No. 5,145,212, which is a continuation-in-part of application Ser. No. 07/160,641, filed Feb. 26, 1988, abandoned which in turn is a continuation-in-part of application Ser. No. 07/156,305, filed Feb. 12, 1988, abandoned.

BACKGROUND OF THE INVENTION

This invention relates generally to the optical arts of holography and diffraction gratings, and more particularly, to a special forms of these optical devices for use in authenticating items as genuine and in various decorative and commercial applications.

There is a wide-spread need to authenticate written information and articles in order to prevent both the counterfeiting of the article and an alteration of a genuine article. Examples of such articles include credit cards, identification cards, driver's licenses, transit passes, passports, stock certificates, and the like. Holograms are currently being extensively used on credit cards and transit passes, for example. An image having observable three-dimensional characteristics is viewable in light reflected from such a hologram.

Because holograms are difficult to make and require a high level of technical sophistication, the difficulty of making counterfeit credit cards, or other article to which a hologram is attached, is increased. A master hologram is made in an optical laboratory with coherent light. The resulting master hologram is capable of reconstructing an image of the object from which it is made. Low-cost replicas are then made from that master. Several specific replication techniques are known, the most common currently being to make the master in a manner that the object information is stored in a surface relief pattern. This surface relief pattern is then transferred to replicas by an embossing or casting operation. A layer of reflective material is applied to each replica surface relief pattern so that the image may be viewed in light reflected from that pattern. The holograms are then firmly attached to the credit card, or other item to be authenticated. The hologram is also constructed of suitable materials so that an attempt to remove the hologram from the article will destroy it, thereby eliminating the transfer of a hologram to some other article.

An authenticating hologram of this type cannot cover printing, photographs and the like carried by the article to be authenticated when that information wants to be viewed. This is because the reflective layer of the hologram is substantially opaque so that any visual information on the article in the area to which it is attached is covered by the hologram. Some credit cards are authenticating some of the raised alpha-numeric information on them by covering at least a few of the characters with the hologram. But any printing, photographs or the like on a flat surface under the hologram is not viewable.

There has been some effort to control the amount of reflective material that is applied to the surface relief hologram so that it will both reflect enough light in order to reconstruct an image recorded in the hologram and at the same time be transparent enough to make visible any printing, photograph or other visual information under the hologram. Besides authenticating the article to which the hologram is attached and the visual information under it, such a hologram has the potential of preventing alteration of that information on an authentic article. It has been found to be very difficult, however, to be able to repeatedly form a reflective layer on the hologram that gives it these advantageous characteristics. Aluminum is usually employed as the reflective material. A proper thickness of that layer can result in the desired partial transparency and partial reflection, but the processes used to date have been very difficult to control in order to provide the proper thickness.

Therefore, it is a specific object of the present invention to provide an improved hologram (or other diffraction grating) for attaching to a document or article over visual information that is to be protected, wherein the information can be observed through the hologram and an image reconstructed from the hologram may be observed.

It is also an object of the present invention to provide an improved non-transparent hologram structure having increased security features.

It is a more general object of the present invention to provide novel display holograms, methods of making them, and articles that incorporate such holograms, for a variety of security, commercial and novelty applications.

SUMMARY OF THE INVENTION

These and additional objects are accomplished by the articles and techniques of the present invention, wherein, briefly, a non-continuous hologram or diffraction pattern is provided from which an image or recognizable diffracted light pattern is reconstructed is formed when illuminated.

In one embodiment of the invention, reflective material on the hologram is maintained to be substantially opaque, as in existing reflection type holograms, but is placed over only part of the surface relief area of the hologram. The visual information behind the hologram on a surface to which it is attached can then be viewed through the non-reflective areas of the hologram. The pattern of the discontinuous layer of reflective material can be anything that provides a reconstructed image sufficiently bright to be observed, and at the same time allowing the visual information behind the hologram to be viewed.

In another specific embodiment, the same type of hologram is used in product packaging in place of a transparent window. This allows the contents of the package to be viewed through the non-continuous hologram while also allowing an image to be reconstructed from it.

In a third embodiment, two or more holograms are formed as part of the same structure by first constructing a non-continuous hologram as summarized above, but then constructing one or more additional holograms in the spaces between the first hologram. A separate image is reconstructed from each hologram. Although this type of hologram is normally opaque, since the plurality of holograms together extend continuously over the entire surface area, a partially transparent structure can alternatively be formed by forming the holograms to together cover less than the entire surface area. Either form of a multiple hologram structure has an application in authenticating documents or articles since it is more difficult to counterfeit than is a single hologram.

Additional objects, advantages and features of the various aspects of the present invention will become apparent from the following description of the preferred embodiments thereof, which description should be taken in conjunction with the accompanying drawings.

DESCRIPTION OF THE PREFERRED EMBODIMENTS

Several different hologram structures, methods of making such structures, and various applications are described. These hologram structures have several different uses but each includes at least one noncontinuous hologram as part it.

Partially Transparent Authenticating Hologram

Figure 1:
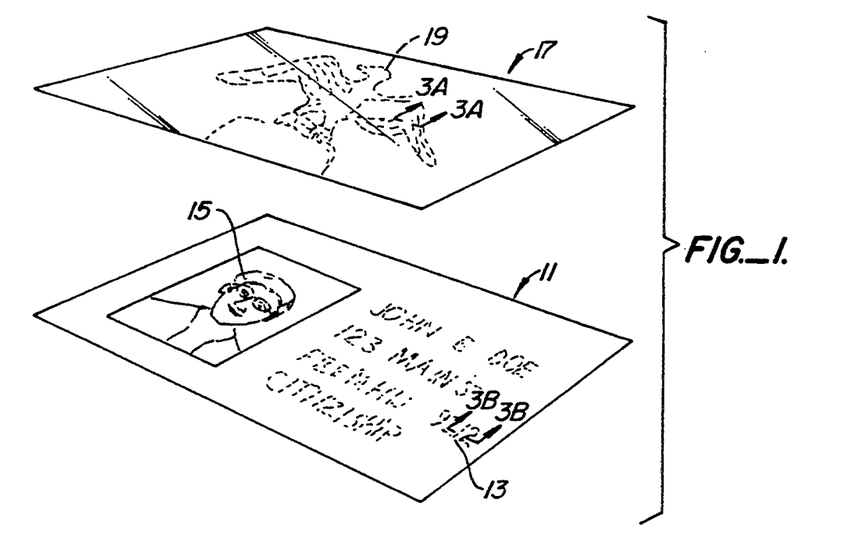
FIG. 1 shows an exploded view of an article having visual information that is protected by an improved hologram of the present invention being attached thereto.

Referring initially to FIG. 1, an exploded view of an article protected by the hologram of the present invention is given. A substrate 11 contains written information 13 printed on a portion of the surface and a photograph 15 attached to that same surface. This example is typical of a class of documents that includes passports, driver's licenses and personal identification cards of various types. The writing 13 is printed flat on the article's surface, and contains, in this example type of article, personal information about the bearer. The photograph 15 is that of the bearer. The substrate 11 can be paper, plastic, or another material that contains some visual information to be protected from alteration or replacement.

The article includes a hologram 17 from which an image 19 of an object is viewable in ordinary light. The hologram 17 is also partially transparent so that when attached to the surface of the substrate 11 containing the writing 13 and photograph 15, alteration of that information is prevented, in addition to authenticating the genuineness of the article. The hologram 17 is securely attached to the substrate 13 by a transparent adhesive. The adhesive is chosen to have a shear strength that is greater than that of the hologram 17 itself so that any attempted removal of the hologram from the substrate causes the hologram to be torn apart. Alteration of the information carried by the substrate 11 is thus made very difficult, if not impossible.

Figure 2:
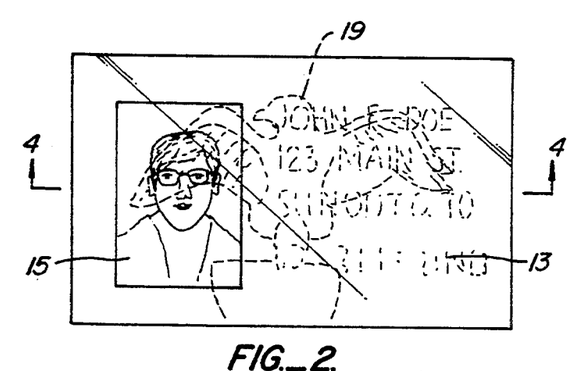
FIG. 2 is a plan view of the protected article of FIG. 1.

FIG. 2 shows a front face of the article with the hologram 17 attached to the substrate 11, showing that both the information printed on the substrate 11 and an image 19 reconstructed from the hologram are simultaneously viewable in ordinary room or outside light. An optical protective device in the form of a hologram of a complex object is generally preferred for protection, but a simpler diffraction grating could be substituted for the hologram 17 so long as it diffracts ordinary light into a recognizable pattern in a manner that a genuine article can be distinguished from a counterfeit. Holograms of complex objects generally provide more security because they are more difficult to make, and thus the chances of them being counterfeited are reduced.

Figure 3A:
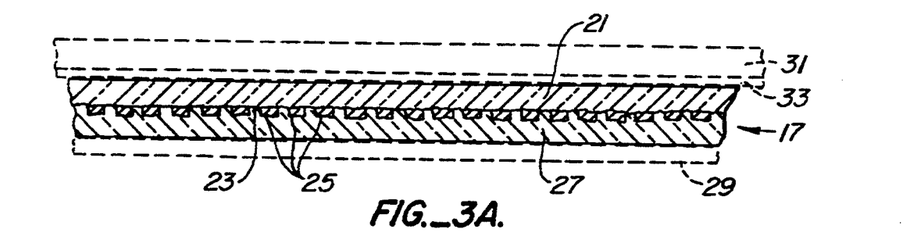
FIG. 3(A) is a cross-sectional view of the hologram of FIG. 1 taken across section 3(A)—3(A) thereof.
Figure 3B:
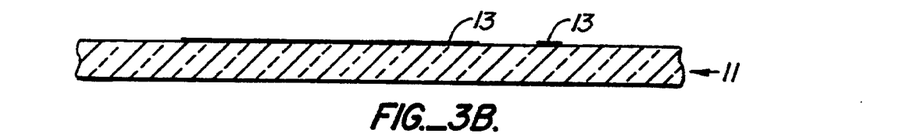
FIG. 3(B) is a cross-sectional view of the protected article of FIG. 1, taken across section 3(B)—3(B) thereof.
Figure 4:
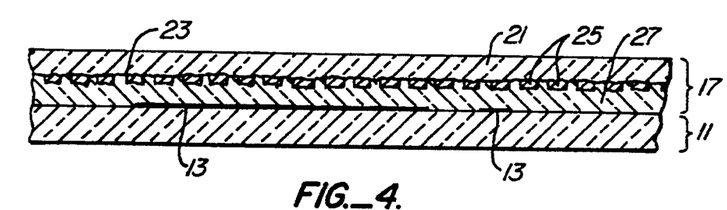
FIG. 4 is a cross-sectional view of the protected article of FIG. 2, taken across section 4—4 thereof.

Enlarged cross-sectional views of the substrate 11 and the hologram 17 are provided in FIG. 3. The writing 13 is shown as ink attached to one surface of the substrate 11. The hologram 17 includes a clear plastic film 21 having a relief pattern 23 in one surface thereof that contains the holographic object information. A discontinuous layer 25 of reflective material, most commonly aluminum, is carried by the surface relief pattern 23. An adhesive layer 27 firmly attaches the exposed portions of the surface relief pattern 23 and the reflective portions 25 to the substrate 11. FIG. 4 shows an enlarged cross-sectional view of the article with the protective hologram attached.

The usual hologram replica, such as that currently used on credit cards, contains a continuous layer of reflecting material, such as aluminum or some other metal, attached to the surface relief pattern of the film. That layer is made thick enough so that as much light as possible is reflected from it, thus maximizing the brightness of the viewed hologram image. The hologram replica 17 is different primarily in using repetitive spots 25 of substantially the same totally reflecting material. The spaces between the reflective spots 25 allow the information carried on the surface of the substrate 11 to be viewed through the hologram 17, while the portions of the surface relief pattern 23 that have reflective spots attached result in light being reflected into a holographic image. The same image can be formed by the hologram 17 as if the reflective layer is continuous, the primary difference being that the image will not be as bright. The effect of a visible screen created by the reflective spots 25 can be minimized by making them small and choosing the appropriate spacing, as discussed hereinafter with respect to FIG. 7.

It is common for security holograms to be attached to a substrate in one of two ways that can also be used with the hologram 17. One way is simply to chose the adhesive 27 to be of a pressure sensitive type. The hologram 17 and substrate 11 are then tightly pressed together at room temperature in order to form a bond between the two of them. After manufacture of the hologram replica 17 itself, such an adhesive is generally covered by a protective release paper layer 29 for storage and shipping, and then is removed just before application to a substrate.

A more popular method of attachment, particularly in high volume operations such as found in applying holograms to credit cards, is a hot stamping technique. This hot stamping technique carries the hologram 17 on a flexible carrier sheet 31 with a wax-like release coating 33. The adhesive 33 is chosen to melt at a much lower temperature than the adhesive 27. When the entire structure of the hologram 17 attached to the carrier 31 is then pressed against the substrate 11 at an elevated temperature, the hologram 17 is released from the carrier 31 as the adhesive 27 is softened for good attachment to the substrate. In the hot stamping operation, the release layer 29 is not utilized. Hot stamping foil and its use in holography is described in U.S. Pat. No. 4,728,377 - Gallagher (1988).

Figure 5A:
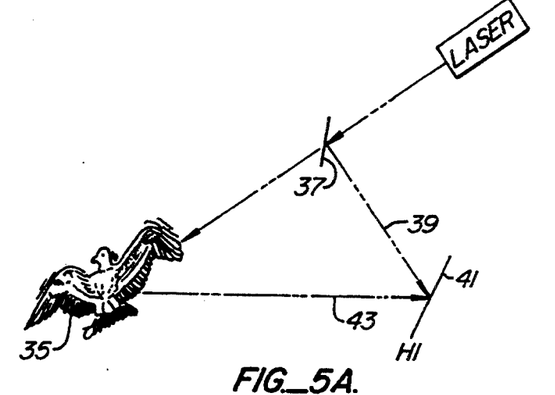
FIGS. 5(A), 5(B) and 5(C) illustrate generally a known technique for making a master hologram.

Although well-known, the usual technique for constructing a master hologram of a three-dimensional object is briefly described with respect to FIG. 5, for completeness. FIG. 5 illustrates an optical layout for making a first hologram H1 from a diffusely reflecting three-dimensional model 35. The model is illuminated by a laser whose output passes through a beam splitter 37. A portion of the intensity of the laser output is directed as a reference beam 39 onto a photosensitive detector 41 for interference at a finite angle with a beam 43 that is reflected from the object 35. When the photosensitive detector 41 is processed, the hologram H1 results. FIG. 5 includes very simplified diagrams, of course, which omit other optical elements in the paths of the beams that are generally used or desirable.

Figure 5B:
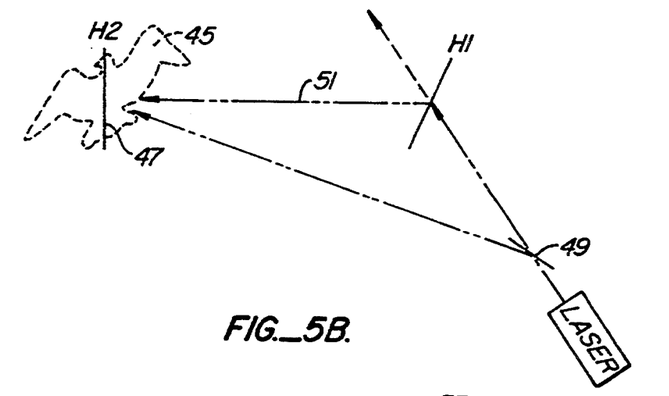

A second step of the master making process is shown in FIG. 5(B). The hologram H1 is illuminated with coherent light from a laser in a manner to reconstruct an image 45 of the original object 35. At the location of the image 45 is positioned a second photosensitive detector 47 which becomes, when processed, a second hologram H2. In order to form a hologram, a beam splitter 49 is positioned in the laser output beam in order to direct a portion of its intensity directly onto the photosensitive detector 47 for interference at a finite angle with a first order diffracted beam 51 that is diffracted from the hologram H1.

Figure 5C:
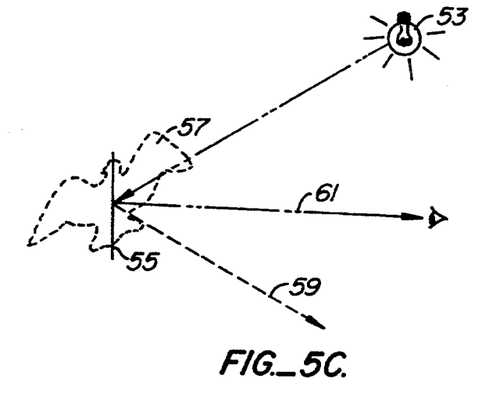

The photosensitive detector 47 is usually chosen to be a photoresist material so that the information of the interference pattern between the two interfering beams can be stored as a surface relief pattern. When a highly reflective, opaque layer is then applied to the surface relief pattern, a reflective hologram results, such as hologram 55 of FIG. 5(C). An image 57 can then be reconstructed and viewed by reflecting light from an ordinary light source 53. Light reflected directly by the reflecting layer, in a zero order beam 59, is not utilized but rather a first order diffracted beam 61, containing the image 57, is used to view an image.

Of course, for making holograms in high volume, a master hologram H2, hologram 47 of FIG. 5(B), is not directly made into such a reflective hologram. Rather, the surface relief pattern on the H2 hologram is reproduced in the form of a plurality of metal stampers which are then used to replicate the surface relief pattern in some way. The several views of FIG. 6 illustrate, in sequence, the making of the hologram 17.

Initially, the film 21 is formed with a surface relief hologram replica in one of two ways. One way utilizes an embossing technique wherein the metal surface relief masters are urged against thin, smooth, clear plastic film under an appropriate amount of pressure and heat in order to form a replica 23 of that surface relief pattern. A second way utilizes a casting technique, wherein the surface relief metal master is used as a mold to which a clear liquid resin is applied and cured between an optically clear flexible plastic substrate and the master mold. A continuous casting process is usually used, wherein the master hologram is fitted on the outside of a drum over which the substrate passes, and the resin is cured by passing ultraviolet light through the substrate while in contact with the master. Such a process is described for replicating holograms and other microstructures in U.K. published application no. 2,027,441A - Martens (1980). By either the embossing or casting technique, the desired surface relief pattern 23 is replicated.

A second major step in making a replica is to form a highly reflective, opaque layer 63 on the surface relief pattern 23. This is most conveniently done by evaporating aluminum onto the film 21.

Figure 6A:
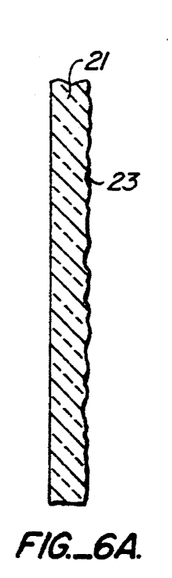
FIGS. 6(A) through 6(E) show the steps in a process for making replicas of a master hologram made in accordance with the method illustrated in FIG. 5.
Figure 6B:
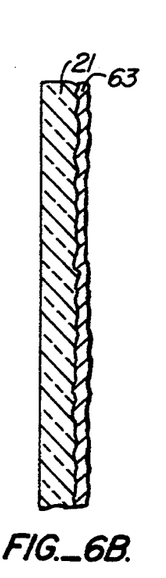
Figure 6C:
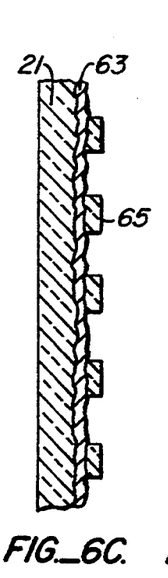
Figure 6D:
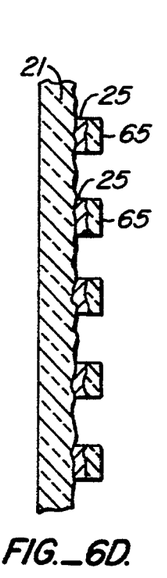

A next step, illustrated by FIG. 6(C), is to print onto the reflective layer 63 spots 65 of protective material of a size and in a pattern corresponding to that of the desired reflective spots 25 on the end product. The material used for the spots 65 must be resistant to an acid bath or other technique that is subsequently used to remove the reflective material layer 63 that is not covered by such material. FIG. 6(D) illustrates the structure after the next step of removing exposed portions of the reflective layer 63 has been accomplished. The structure is then washed and dried, the completed hologram structure being as shown in FIG. 6(D). However, in some processes, the masking spots may additionally be removed, resulting in a structure illustrated in FIG. 6(E). A subsequent step (not shown) of applying the adhesive layer 27 to the hologram structure of either FIG. 6(D) or FIG. 6(E) results in the hologram replica 17 described previously.

Figure 6E:
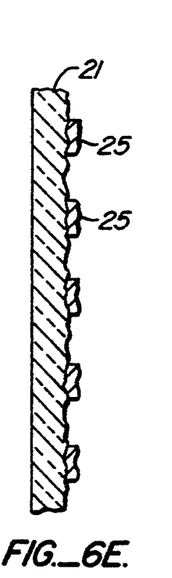

There are several alternative known techniques which can be applied as part of the steps discussed with respect to the illustrations of FIGS. 6(C) through 6(E). If the reflective layer 63 is aluminum, which is the most common material in this application, dilute sodium hydroxide is suitable for application to the layer 63 of FIG. 6(C) in order to etch away its exposed areas, resulting in what is shown in FIG. 6(D). The material for the dot mask 65 must properly stick to the reflective layer 63 and be resistant to whatever etching solution is utilized.

As an alternative to using a resist mask to define the portions of the reflective layer to be removed, an appropriate etching solution may be "printed" directly onto the reflective surface in the desired pattern of material removal. After etching takes place in this pattern, the etched material is neutralized and/or removed.

The pattern of masking dots 65 may be applied to the reflective layer 63 by a spray technique through a mask having holes corresponding to the desired locations of the spots 65. However, it is preferable to use a technique and type of equipment found in the printing industry to print fine-lined pictures and patterns. In one such technique, a Gravure cylinder is used to apply the spots.

Such a cylinder has a very smooth surface except for carefully machined indentations at the locations where the mask dots 65 are to be placed. A continuous web of film 21 with continuous layer 63 of reflective material is then passed across this surface in a rolling action so that liquid contained within these holes is transferred to the reflective layer 63. The masking liquid is placed into the holes by the cylinder being immersed in the liquid and excess being removed by a blade that scrapes along the surface of the cylinder. The primary advantage of borrowing this printing technique for this new application is the high resolution and control of the resulting reflective dots that can be obtained. Another known technique can alternatively be borrowed from printing technology, including one selected from any of silk screen, flexographic, letter press or offset techniques.

There are several alternative techniques for forming the pattern of reflective dots 25 that can be utilized in place of the printing methods discussed above. One way is to apply the aluminum directly to the surface relief pattern 23 of the film 21 by evaporation through a mask having holes corresponding to the locations of the desired spots 25. A disadvantage of this technique is, of course, that aluminum will deposit on the mask as well, making its life very short or creating problems in keeping the mask clean. Another alternative is to form the spots 25 directly by a printing technique with the use of a liquid form of aluminum, such as aluminum trihydride.

Figure 7:
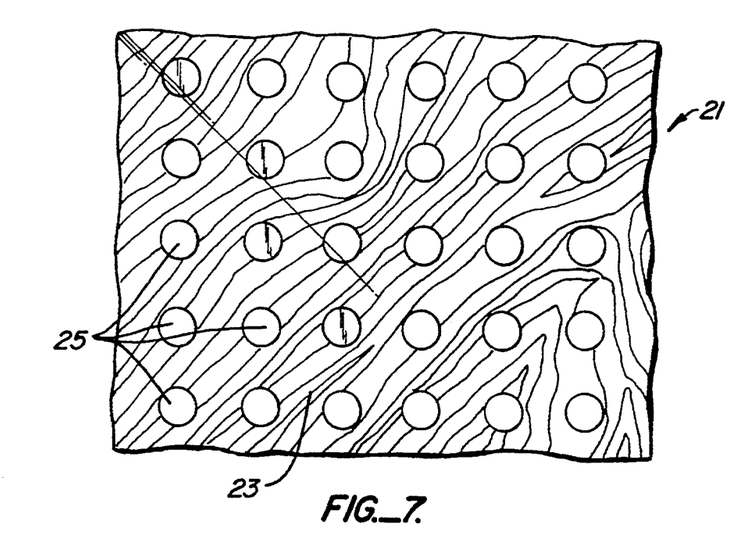
FIG. 7 shows an enlarged plan view of a hologram replica made in accordance with the method illustrated in FIG. 6.

Referring to FIG. 7, a plan view of the pattern of reflective dots 25 is illustrated. Of course, the dots 25 can be made in practically any shape, and the pattern may be varied, the important consideration being to have enough of the hologram made reflective so that a holographically reconstructed image may be clearly seen, but yet not so much that the visual information beneath the hologram on the article being protected is clearly viewable and readable. Since it usually simplest to form circularly shaped dots 25 in a regular, repeated pattern, that is the example being described herein but it will be understood that is not a requirement of the invention. A dot spacing, expressed in lines (dots) per lineal inch, can be substantially within the range of from 25 to 400, depending upon the specific effect desired. The amount of space across a hologram that is covered by the dots can be from ten percent to ninety percent. A preferred range for most applications is a dot spacing of from 65 to 200 per inch with overall density being within a range of from 15 to 60 percent. Each of the dots 25 is preferably made of aluminum having a thickness within a range of from 200 to 600 Angstroms.

Another desirable characteristic for most applications is to make the individual dot size and density small enough so that they are not resolvable (viewable) by the ordinary observer when held by hand at a normal reading distance, generally from about 16 to 30 inches. The printing techniques used for forming the size of the individual dots allows them to be made very small and a precise pattern formed.

One application of the security hologram 17 is for passports. In such an example, the hologram must be transparent enough so that the photograph and personal data on the page to which the hologram is attached are be clearly visible. The hologram image in this case does not form a part of the overall visual artwork but serves a sole function of allowing passport control officers and the like to easily determine whether the holographic image exists and thus whether the passport is genuine or not. For such an application, the following parameters are generally desirable: dot spacing of from 65 to 130 lines per inch and an overall density of from 15 to 30 percent.

In other applications, such as with credit cards or other commercial articles, it is desired that the hologram image be as bright as reasonably possible in order that it can form part of the artwork of the card or other article. In this case, more area needs to be covered by the reflective dots 65. For this application, the following range of parameters is selected: a dot spacing of from 85 to 200 lines per inch and an overall proportion of the active hologram area covered by reflective material being from 30 to 60 percent.

In the document authentication applications of the hologram described hereinabove, the example composite article, such as shown in FIG. 2, provides for the image reconstructed from the hologram to be viewable simultaneously with the printed information that is located behind the hologram. It may be desirable in some applications to provide for the printed information to be viewable with a much reduced, or near zero, intensity of the reconstructed holographic image, the holographic image then being viewable upon the observer reorientating the article somewhat in order to verify its authenticity. Two specific ways of providing this characteristic are illustrated in FIGS. 8 and 9.

Figure 8A:
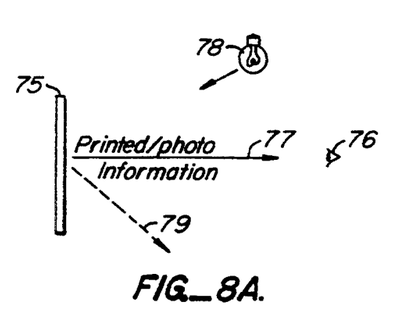
FIGS. 8A and 8B show an article protected with an alternative form of hologram.
Figure 9A:
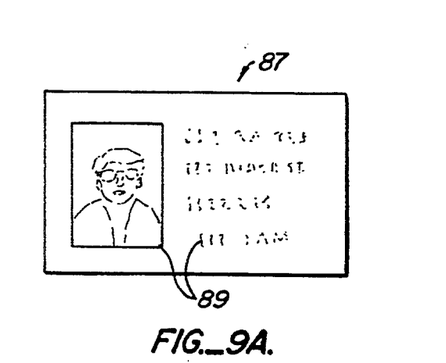
FIGS. 9A and 9B show an alternate technique for protecting an article.
Figure 9B:
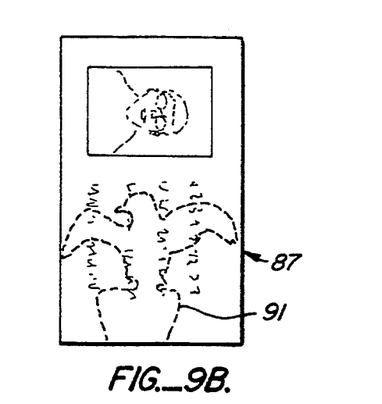

Referring to FIGS. 8A and 8B, an article 75 containing a hologram on its side facing an observer 76 has been constructed so that the article must be rotated about a substantially horizontal axis in order for a reconstructed image 85 to be observed. FIG. 8A illustrates the observer 76 looking at the article 75 straight on, through the hologram, in order to see the printed information along a path 77. The observer will naturally orient the article 15 in a way that avoids seeing light 79 reflected from a light source 78 by the article 75. The hologram on the article 75 has been made in a manner that an image reconstructed from it will not be visible, or is very dim, when the article is oriented with respect to the observer's line of vision to provide the best view of the printed information and/or photograph behind the hologram.

Figure 8B:
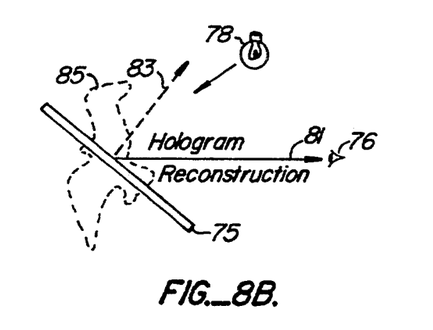

FIG. 8B shows the article 75 being oriented to a position with respect to the viewer 76 that is an unnatural one for the normal reading of a document but which results in an image 85 reconstructed from the hologram to be viewable along a path 81. The hologram is constructed so that the path 81 forms a small finite angle with a surface of the article 75 and the hologram attached to it, and so that light 83 reflected from the article avoids the eyes of the viewer 76.

As is well known, a master hologram may be made so that its reconstructed image, as well as those of its replicas, are viewable only when the hologram is tilted to an angle with respect to the viewer that is within a particular narrow range of angles. In such a case, the hologram 17 is made so that its image is reconstructed at its brightest when viewed along a path making a small angle with those surfaces, and a minimum when viewed along a perpendicular path. Such angular selectivity is accomplished by changing the initial angular relationships when the master hologram is initially made according to the standard technique illustrated in FIG. 5A.

FIGS. 9A and 9B show a different arrangement wherein the hologram 17 of FIG. 1 is rotated ninety degrees with respect to the article 11 before they are attached. The resulting composite article 87 then provides no reconstructed holographic image when oriented with respect to the viewer, as indicated in FIG. 9A, for normal observation of the information 89 carried by the article. Only a general, dull outline of the hologram image is dimly visible. But when the composite article 87 is rotated ninety degrees around a line extending between the observer's eyes and the article, as shown in FIG. 9B, an image 91 reconstructed from the hologram becomes brightly visible. This particular angular sensitivity is a characteristic of the standard well known "rainbow" hologram, without having to do anything more. That is, the master making steps illustrated in FIGS. 5A and 5B include optics (not shown) that limit the bandwidth of the information recorded by the hologram in a manner to eliminate vertical parallax of an image reconstructed therefrom while retaining its horizontal parallax.

Partially Transparent Packaging Hologram

Figure 10:
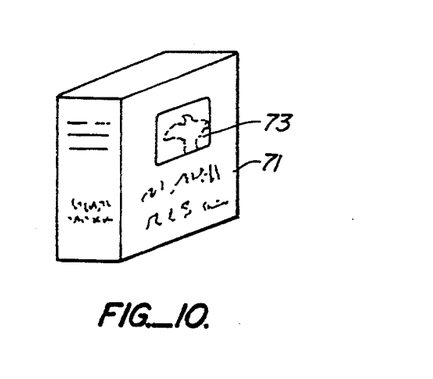
FIG. 10 shows a non-security application of a hologram of the present invention in product packaging.

The hologram described hereinabove is emphasized for applications involving the authentication of documents or other articles. The same hologram also has non-security applications. An example is illustrated in FIG. 10, wherein an opaque consumer package 71 includes a see-through window 73 in the form of a hologram, which can be of the type of hologram 17 discussed previously. Such a partially transparent hologram then allows the consumer to observe the contents of the package by looking through the hologram, and also to be able to observe the holographically reconstructed image. For this application, the reflective dot spacing and density is preferably selected to be within the ranges given above for credit cards or other commercial articles.

Multiple Hologram Structure

The non-continuous hologram techniques described above also have applicability as a first step in forming a multiple hologram. To do this, one or more holograms are formed in the regions of the hologram between the reflective portions of the first non-continuous hologram formed as above. Enough space between holograms can be left in order to retain the ability to see through it to some information behind. More commonly, rather than being left transparent as described above, the space between the first hologram areas is filled in to include one or more holograms. In either case, the result is a hologram structure from which two or more images, one for each separate hologram recorded on it, can be viewed, one at a time, by properly orienting the hologram with respect to the viewer. Multiple holograms are thus recorded side-by-side, rather than being stacked one on top of another as has previously been done. This avoid problems with crosstalk between the multiple holograms as is often encountered in the previous stacking technique.

Figure 11:
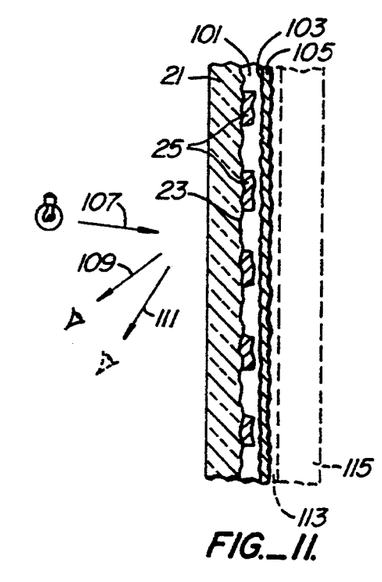
FIG. 11 is a cross-sectional view of one embodiment of a multiple hologram.

Referring to FIG. 11, a cross-sectional view of an example of a multiple hologram is illustrated. The structure previously described with respect to FIG. 6E is a major component. That structure is a transparent film 21, having a surface relief hologram 23 form therein, and spots 25 of reflective material attached to the surface 23. The multiple hologram of FIG. 11 is formed by adding to that structure a layer 101 that covers the exposed portions of the surface relief pattern 23 and the reflective spot 25. The second hologram is formed in a surface relief pattern 103 on an outside surface of the layer 101. The surface relief hologram 103 is then covered by a thin reflective material layer 105. The layer 101 is preferably formed by casting it on to the initial hologram structure of FIG. 6E and polymerizing it in place by radiation or heat while trapped between the film 21 and a surface relief master (not shown) of the second hologram. The continuous layer 105 of reflective material is preferably made of aluminum that is deposited by any standard technique.

The first hologram master used to make the surface relief pattern 23, and the second hologram master used to make the second surface relief pattern 103, are cooperatively constructed so that the images recorded are separably reconstructed. An example is shown in FIG. 11 wherein illuminating light 107 causes a first image to be reconstructed along a path 109 from light diffracted from the first hologram relief pattern 23 in regions covered by the reflective spots 25. A second image is reconstructed along a path 111 from light diffracted from the second hologram relief pattern 103 upon reflection from the layer 105 in regions between the reflective, opaque spots 25 of the first hologram. It is desirable that an interface between the layers 21 and 101, at the first hologram surface 23 between the reflective spots 25, not reflect any significant portion of incident light. This is accomplished by making the refractive indices of the layers 21 and 101 to be substantially the same.

The precise angles of the diffracted light beams 109 and 111 depends upon the optical geometry used in making the original masters of tie first and second holograms from which the surface relief patterns 23 and 103 are respectively formed. Alternative to making the master holograms reconstruct images at different angles, as shown in FIG. 11, or in addition thereto, the holograms can be made so that an image from one hologram is viewable when the structure of FIG. 11 is held in one rotational position in the plane of the structure, while the other image is not. The second hologram reconstructed image is viewable in another rotational position, while the first is not. Such a rotational sensitive hologram has already been described with respect to FIGS. 9A and 9B.

Although two holograms are shown in the embodiment of FIG. 11, it can be seen that two is not a limit. A third hologram can be formed intermediate of the two shown in FIG. 11 by a separate casting step and aluminizing that third hologram in only a portion of the space between the reflective, opaque spot 25 of the first hologram. Thus, with such a structure, incident light would be reflected from each of the three hologram reflective layers. The holograms can be made so that, upon proper orientation of the multiple hologram structure when being viewed, only one image can be seen at one time.

The shapes and coverage of the opaque, reflective spots 25 on the first hologram of the structure of FIG. 11 are preferably made in a different range than that described above for the partially transparent hologram. For the amount of the surface area of the first hologram relief pattern 23 that is covered by a reflective spot 25 is preferably about 50% of the surface area, in the case of a two hologram structure, about one-third of the surface area, in the case of a three hologram structure, and so forth. Rather than circular shapes for the reflective spot 25 of the first hologram, rectilinear shapes are preferable for the multiple holograms so that one hologram does not become predominant over another. Squares or stripes are preferred for the first hologram reflective spots.

One use for a multiple hologram of the type described with respect to FIG. 11 is for security; namely, attachment to articles or documents which are to be authenticated as genuine. Of course, since the entire hologram structure is opaque, the hologram cannot be placed over any visual information on the article or document desired to be simultaneously observed, as with the partially transparent holograms of embodiments described earlier. But the structure of FIG. 11 has an advantage for authentication uses in that the first hologram is "buried" in the middle of the structure, making it virtually impossible for a counterfeiter to physically take the hologram apart in order to physically replicate the first hologram that is embodied in the relief pattern of the surface 23.

For security, decorative and other uses of the multiple hologram structure, the structure is attached to an article, document or other substrate in any of the ways discussed previously. With reference to FIG. 11, a layer 113 is indicated as an adhesive for attaching the structure to a substrate 115. The adhesive 113 may be a hot melt adhesive, in the case of the multiple hologram structure being incorporated in the form of a hot stamping foil, or may be a pressure sensitive adhesive. The substrate 115 may include a credit card, stock certificate, currency, videotape, or other document or article to be authenticated as genuine, or may be a product package, novelty item or the like, in the case of commercial or decorative uses of such a multiple hologram.

Figure 12:
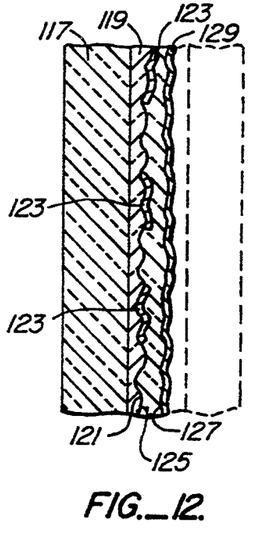
FIG. 12 shows an a more specific form of the multiple hologram embodiment of FIG. 11.

The embodiment of FIG. 11 shows a generic film 21 having a surface relief pattern 23 that can be formed by either standard embossing or casting techniques. The preferred replication technique for most applications is by casting the hologram surface relief patterns. FIG. 12 shows a cross-sectional view of a completed hologram having the same characteristics as that described with respect to FIG. 11 but specifically showing multiple casting layers. A thin, transparent plastic film 117 has a first layer 119 formed thereon by casting a liquid resin between the film 117 and a master hologram surface relief pattern while the resin is cured in order to harden with a surface relief pattern 121 conforming to that of the master hologram. A reflective, opaque material is applied to the surface 121 in a discontinuous pattern, leaving reflective material regions 123.

The second hologram is formed by casting, directly over the surface 121 and reflective layer portions 123, a second cast layer 125. The layer 125 is formed by a second step, like the first, except that it is the film 117 with the first hologram formed that is held against a surface relief master hologram with a polymerizable liquid resin between it, so that a resulting relief pattern in an outer surface 127 conforms to the surface relief pattern of the second hologram master. That surface is then coated in its entirety with a thin, opaque, reflective coating 129. The resin used to form each of the two cast layers 119 and 125 is preferably the same, thereby resulting in the layers 119 and 125 having the same refractive indices. This then eliminates any reflection from the first hologram surface relief pattern 121 in regions that are not coated by a reflected material 123.

Figure 13A:
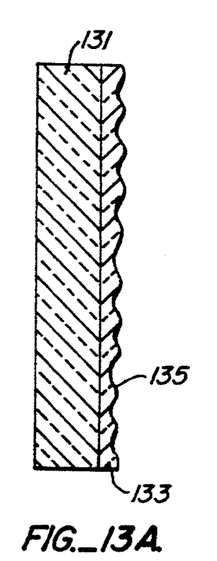
FIGS. 13A, 13B, 13C illustrate a method of making another embodiment of a multiple hologram.
Figure 13B:
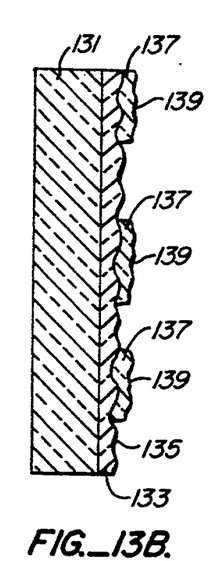
Figure 13C:
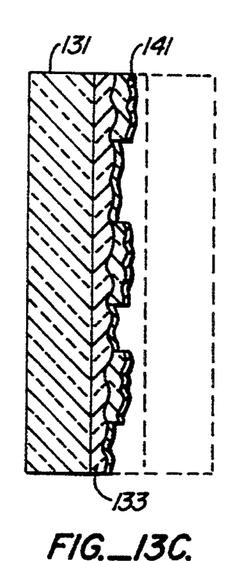

An alternate technique for forming a cast multiple hologram is illustrated in the three views of FIG. 13. Referring to FIG. 13A, a transparent film 131 first has a layer 133 cast onto one side of it in order to form a surface relief pattern 135 corresponding to that of a first hologram master. Rather than apply any reflective material to the surface 135 before forming the second hologram, discreet areas of a second resin layer 137 are formed that contain in an outer surface relief pattern 139 a second hologram that corresponds to the relief pattern of a second hologram master. The same material is preferably used for the two hologram layers 133 and 137, thereby assuring that they each have the same refractive index and the junction between the layers thus will not reflect incident light. The second hologram layer 137 is cast in a non-continuous form of squares, stripes and the like, with the same considerations applying as described above for the shape and spacing of the reflective spots 25 (FIG. 11). As shown in FIG. 13C, the entire exposed surface of the first and second holograms is then coated by a thin reflective layer 141 in a single step. The result is essentially the same as that of the structure of FIG. 12, but the method of FIG. 13 better lends itself to a continuous process since there is only a single metallizing step after both cast layers are formed.

As yet another alternative to the foregoing techniques of forming a multiple hologram, two separately replicated holograms can be attached together, face-to-face, by an appropriate transparent adhesive. For example, a partially metallized hologram, such as shown in FIG. 6E, can be one of them. This hologram contains a first image. A second hologram is made to have a continuously metallized surface relief pattern, the form of which is shown in FIG. 6B. The second hologram carries a second image. These two holograms are then attached together by a transparent adhesive with their metallized layers facing each other. The two images are then viewed through the transparent substrate of the first hologram. The substrate of the second hologram need not be transparent but it will usually be more convenient to make it so.

Hologram Attachment to a Substrate

Several of the preceding examples of the use of holograms of various constructions call for attachment of a hologram to a substrate with an adhesive layer. One example is the structure of FIG. 4, wherein a partially metalized hologram 17 is attached to a substrate 11 by an adhesive layer 27 in order to secure information 13 that is printed on the substrate 11. Other examples are shown in FIGS. 11, 12 and 13. When hologram replicas formed by a casting process are so attached to a substrate, it is preferred in security applications that the adhesive used has a bonding strength that is significantly greater than the bonding of internal hologram layers.

As discussed above, a typical technique of forming hologram replicas by casting involves casting the hologram surface relief pattern in a liquid resin coated onto a thin optically transparent film. After the resin is hardened by curing, a hologram results that has the resin hologram layer attached to the carrying film with a certain bonding strength that can be controlled somewhat by material and process choices. An adhesive is then chosen to attach the cast layer of the hologram (after metallizing) to the substrate with this bonding strength being much greater than that of the cast layer to the hologram carrying film.

There are at least two specific applications of this differential bonding. In a first, a cast hologram so adhered to a substrate has, as a final step, its carrying film stripped away, thereby leaving the composite structure with the hardened cast layer exposed. Such a structure is very resistant to tampering since the cast layer has no integrity by itself. Any attempts to remove the thin and fragile cast layer will cause it to disintegrate. This makes it impossible for the hologram to be removed from a protected document or article and reused on as counterfeit item. In a second example, the carrying film is retained on the outside of the composite structure, when its additional protection is desired. The differential bonding also adds security to the structure of this second example since tampering with the hologram will initially result in the protective film being separated from the structure while the cast resin hologram layer remains attached to the substrate.

Although the present invention has been described with respect to its preferred embodiments, it will be understood that the invention is entitled to protection within the full scope of the appended claims.

It is claimed:

1. A method of making a hologram or diffraction grating, comprising the steps of:
   forming in a surface of a substantially transparent substrate a continuous relief pattern over an area thereof that is capable of forming a recognizable image upon polychromatic viewing light being reflected from the surface relief pattern, and
   forming non-continuous, substantially opaque reflective layer areas over said surface relief area with a pattern that allows simultaneous viewing completely through the substrate across said area and viewing of an image reconstructed from the portions thereof to which said reflective material is attached, said step forming the pattern of said discontinuous opaque reflective layer portions with a spacing in excess of 25 such portions per inch in at least one direction across said relief pattern.

2. A method of protecting visual information on a surface of an article from alteration, comprising the steps of:
   forming in a surface of a substantially transparent substrate a continuous relief pattern over an area thereof that is capable of forming a recognizable image upon polychromatic viewing light being reflected from the surface relief pattern,
   forming a discontinuous, substantially opaque reflective layer over at least a part of said surface relief area with a pattern that allows both viewing completely through the substrate across said area part and viewing of an image reconstructed from the portions thereof to which said reflective material is attached, said step forming the pattern of said discontinuous opaque reflective layer portions with a spacing in excess of 25 such portions per inch in at least one direction across said relief pattern, and
   attaching said substrate firmly to said article in a position with at least said part of said surface relief pattern positioned over said visual information, thereby to protect said visual information from alteration.

3. The method according to claim 2 wherein the step of forming the reflective pattern includes the steps of:
   forming a thin metal layer over the entire surface relief area,
   printing a protective layer of material over said metal layer in said pattern, and
   etching away that portion of the metal layer not covered by said protective layer.

4. The method according to claim 2 wherein the step of forming a surface relief pattern includes the step of embossing said pattern into a solid thin film surface.

5. A method according to claim 2 wherein the step of forming the surface relief pattern includes casting said pattern in a liquid form and then solidifying it by curing.

6. The method according to claim 2 wherein the step of forming a discontinuous, substantially opaque reflective layer includes forming discontinuous reflective layer portions having a spacing in excess of 85 such portions per inch in at least one direction across said surface relief area part.

7. The method according to claim 2 wherein the step of forming a discontinuous, substantially opaque reflective layer includes forming discontinuous reflective layer portions having a density such that the total area covered by said reflective layer portions is within a range of from ten to ninety percent of said surface relief area part.

8. The method according to claim 2 wherein the step of forming a discontinuous, substantially opaque reflective layer includes forming discontinuous reflective layer portions having a spacing within a range of substantially 85 to 200 such portions per inch in at least one direction across said surface relief area, and with a density such that the total area covered by said reflective layer portions is within a range of from 30 to 60 percent of said surface relief area part.

9. The method according to claim 2 wherein the step of forming a discontinuous, substantially opaque reflective layer includes forming discontinuous reflective layer portions having a spacing within a range of substantially 65 to 130 such portions per inch in at least one direction across said surface relief area, and with a density such that the total area covered by said reflective layer portions is within a range of 15 to 30 percent of said surface relief area part.

10. The method according to claim 2 wherein the step of forming a discontinuous, substantially opaque reflective layer includes forming discontinuous reflective layer portions having a spacing within a range of substantially 65 to 200 such portions per inch in at least one direction across said surface relief area, and with a density such that the total area covered by said reflective layer portions is within a range of from 15 to 60 percent of said surface relief area part.

11. The method according to any one of claims 7, 8, 9 or 10 wherein the step of forming a discontinuous, substantially opaque reflective layer includes forming discontinuous reflective layer portions which are substantially circularly shaped spots.

12. The method according to any one of claim 7 or 10 wherein the step of forming a discontinuous, substantially opaque reflective layer includes forming a hologram characterized by said reconstructed image having a three-dimensional aspect.

* * * * *